United States Patent
Lin

(10) Patent No.: US 7,175,412 B2
(45) Date of Patent: Feb. 13, 2007

(54) HEAT PRESSING DIE SET FOR FORMING EMBOSSED DESIGNS ON GARMENTS

(76) Inventor: Chin-Chen Lin, No. 8, Alley 1, Lane 113, Sec. 1, Chung Yang Rd., San Chung City, Taipei (TW)

( * ) Notice: Subject to any disclaimer, the term of this patent is extended or adjusted under 35 U.S.C. 154(b) by 0 days.

(21) Appl. No.: 10/342,268

(22) Filed: Jan. 15, 2003

(65) Prior Publication Data

US 2004/0137103 A1    Jul. 15, 2004

(51) Int. Cl.
*B29C 59/02*    (2006.01)

(52) U.S. Cl. ............... 425/290; 425/355; 425/363; 425/384; 425/385; 425/396; 425/DIG. 44

(58) Field of Classification Search ........ 425/289–290, 425/352–355, 363, 365, 384–385, 394–396, 425/DIG. 44; 156/209, 443; 264/284
See application file for complete search history.

(56) References Cited

U.S. PATENT DOCUMENTS 3,584,572 A * 6/1971 Apicella .................... 264/163
3,985,491 A * 10/1976 King ......................... 425/384
4,422,837 A * 12/1983 Rasmussen ................. 425/363
5,648,107 A * 7/1997 Kagawa et al. ............. 425/363

FOREIGN PATENT DOCUMENTS

JP    06212559 A  *  8/1994

* cited by examiner

*Primary Examiner*—Yogendra N. Gupta
*Assistant Examiner*—Thu Khanh T. Nguyen
(74) *Attorney, Agent, or Firm*—Troxell Law Office, PLLC

(57) ABSTRACT

A heat pressing die set for forming embossed designs on garments includes a male and a female die seat on which a silicon and a metal die are respectively supported. The silicon and the metal die are cut according to given designs to form complementary male and female die surfaces. Continuous flat belt zones of a predetermined width are separately provided on the silicon and the metal die corresponding to perimeters of the given designs. When an area of a garment is clamped and heat-pressed between the silicon and metal dies, the given designs are embossed on the garment and surrounded by heat-pressed belts, which visually highlight the embossed designs while protect non-embossed areas on the garment against undesired pull and stretch to therefore upgrade the quality of the embossed designs.

1 Claim, 3 Drawing Sheets

HEAT PRESSING DIE SET FOR FORMING EMBOSSED DESIGNS ON GARMENTS

BACKGROUND OF THE INVENTION

The present invention relates to a heat pressing die set for forming embossed designs on garments, and more particularly to a heat pressing die set including silicon and metal dies having complementary male and female designs as well as flat belt zones provided thereon for heat pressing and thereby producing on a garment clamped between the dies embossed designs surrounded by heat-pressed belts.

As a means to decorate or change the appearance of a garment, different designs are frequently embossed on selected areas on the garment by taking advantage of a tensile property of materials for forming the garment. The materials for garments may include, for example, cotton, nylon, Tetoron (polyester films), leather, etc. In a conventional heat pressing technique for forming embossed designs on a garment, a type of thermally gel-forming filler is applied to an inner surface of the garment at areas for forming the embossed designs, so that the filler forms gel to support the embossed designs during the course of heat pressing. The applying of the thermally gel-forming filler to the garment complicates the heat-pressing process and the embossed designs so formed have poor hand touch and uneven and stiff appearance without showing distinct ups and down or sharp contouring lines. In another conventional heat pressing technique for forming embossed designs on a garment, a single die surface being cut according to given designs is used and the thermally gel-forming filler is omitted to overcome the problem of thick and stiff embossed designs. However, the embossed designs formed on the garment heat-pressed with the single die surface have not sharp ups and downs and contouring lines and therefore provide poor ornamental effect.

SUMMARY OF THE INVENTION

A primary object of the present invention is to provide a heat pressing die set for forming on garments embossed designs having distinct ups and downs and sharp contouring lines to upgrade the quality of the embossed designs.

Another object of the present invention is to provide a heat pressing die set for forming on garments embossed designs having heat-pressed continuous flat belts provided along perimeters thereof, so that the embossed designs on the garment is visually highlighted and the areas on the garment other than the embossed designs are protected against undesired pull or stretch during heat pressing to spoil the original property of the material forming the garment.

To achieve the above and other objects, the heat pressing die set of the present invention includes a male and a female die seat on which silicon and metal dies are respectively supported. In an embodiment, the silicon and the metal die are cut according to given designs to form complementary male and female die surfaces. Continuous flat belt zones of a predetermined width are separately provided on the silicon and the metal die corresponding to perimeters of the given designs. When a selected area of a garment is clamped and heat-pressed between the male and female die surfaces, the given designs are embossed on the garment and surrounded by heat-pressed belts, which visually highlight the embossed designs while protect non-embossed areas on the garment against undesired pull and stretch to therefore upgrade the quality of the embossed designs.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
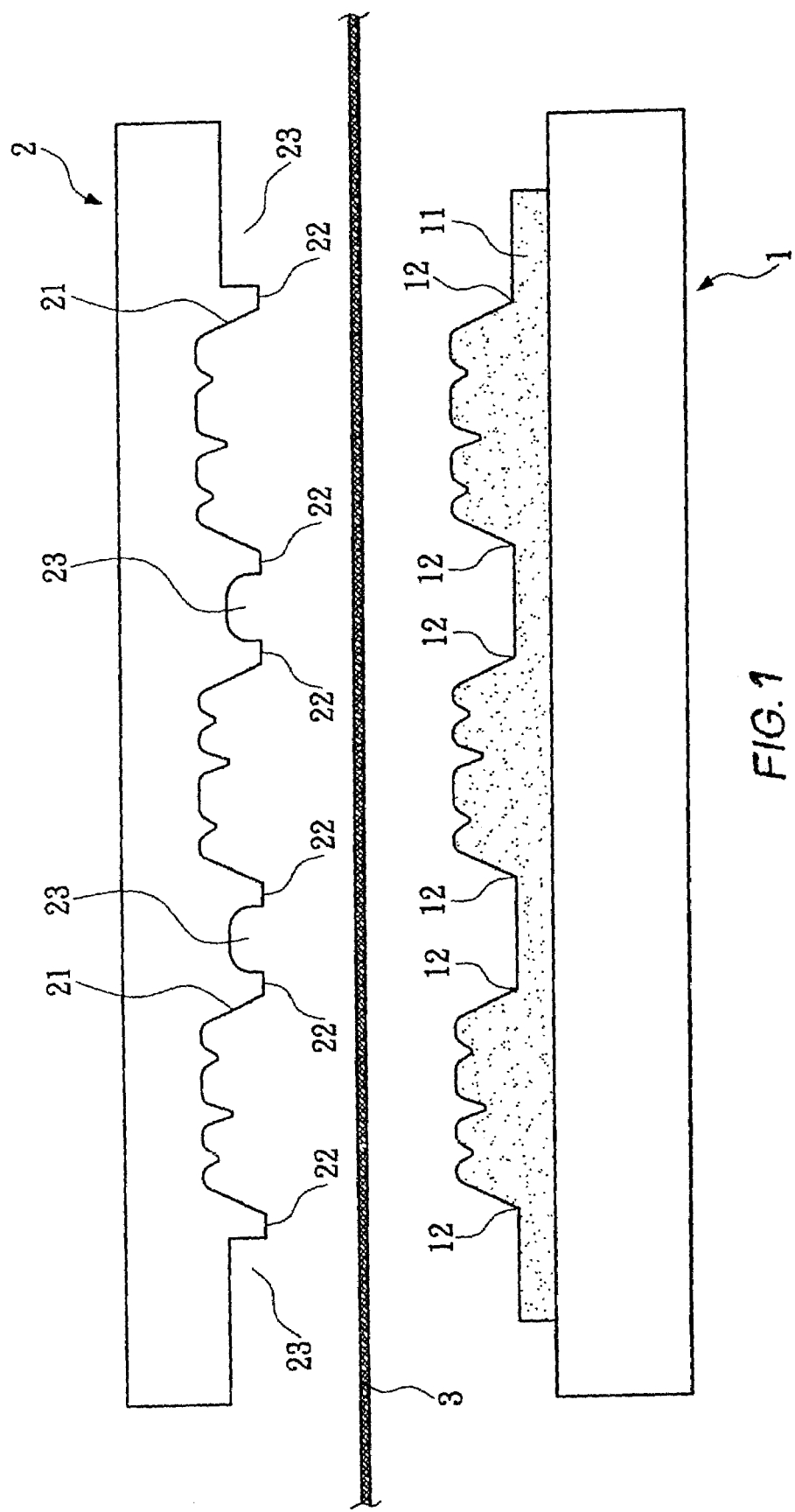
FIG. 1 is an exploded sectional view of a heat pressing die set for forming embossed designs on garments according to an embodiment of the present invention.
Figure 2:
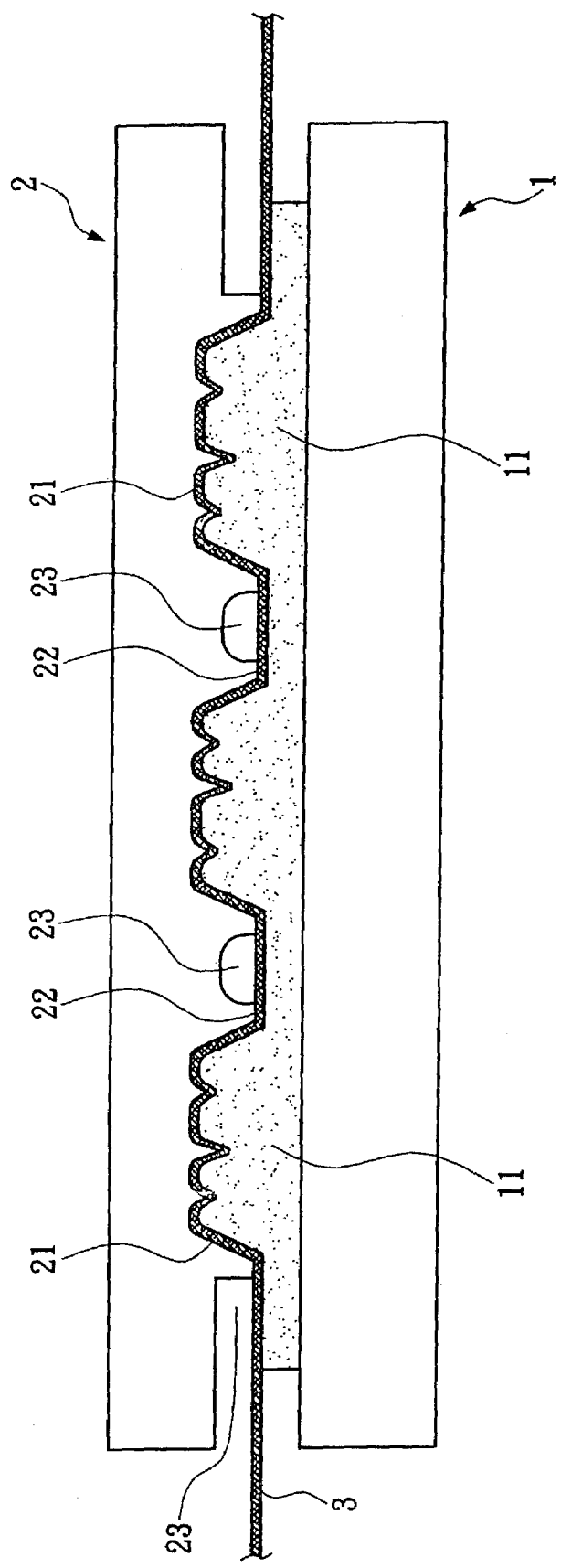
FIG. 2 is an assembled view of FIG. 1.

Please refer to FIGS. 1 and 2 that are exploded and assembled sectional views, respectively, of a heat pressing die set for forming embossed designs on garments according to an embodiment of the present invention. The heat pressing die set includes a male die seat 1 and a female die seat 2. A silicon die 11 and a metal die 21 are correspondingly supported on the male die seat 1 and the female die seat 2, respectively. The silicon die 11 and the metal die 21 are cut according to given designs to form complementary die surfaces thereon. In the illustrated embodiment, the silicon die 11 is cut to a male die surface showing the given designs and the metal die 21 is cut to a female die surface showing the given designs. When the male die seat 1 and the female die seat 2 are closed to each other under a pressure, the silicon die 11 and the metal die 21 are joined to tightly bear the complementary male and female die surfaces against each other, so that a selected area of a garment 3 being clamped therebetween may be heat-pressed to show the given design in an embossed state. It is also possible to form a male die surface on the metal die 21 and a complementary female die surface on the silicon die 11 to create exactly the same embossing effect as the illustrated embodiment.

On the silicon die 11 and the metal die 21, there are also continuous flat belt zones 12, 22 of a predetermined width being correspondingly formed on the complementary die surfaces of the dies 11, 21 along perimeters of all given design cut thereon. More specifically, the belt zones 12, 22 are provided on the dies 11, 21 along not only an overall outer periphery of all the given designs, but also perimeters of all non-design areas on the garment distributed between two or more given designs.

Figure 3:
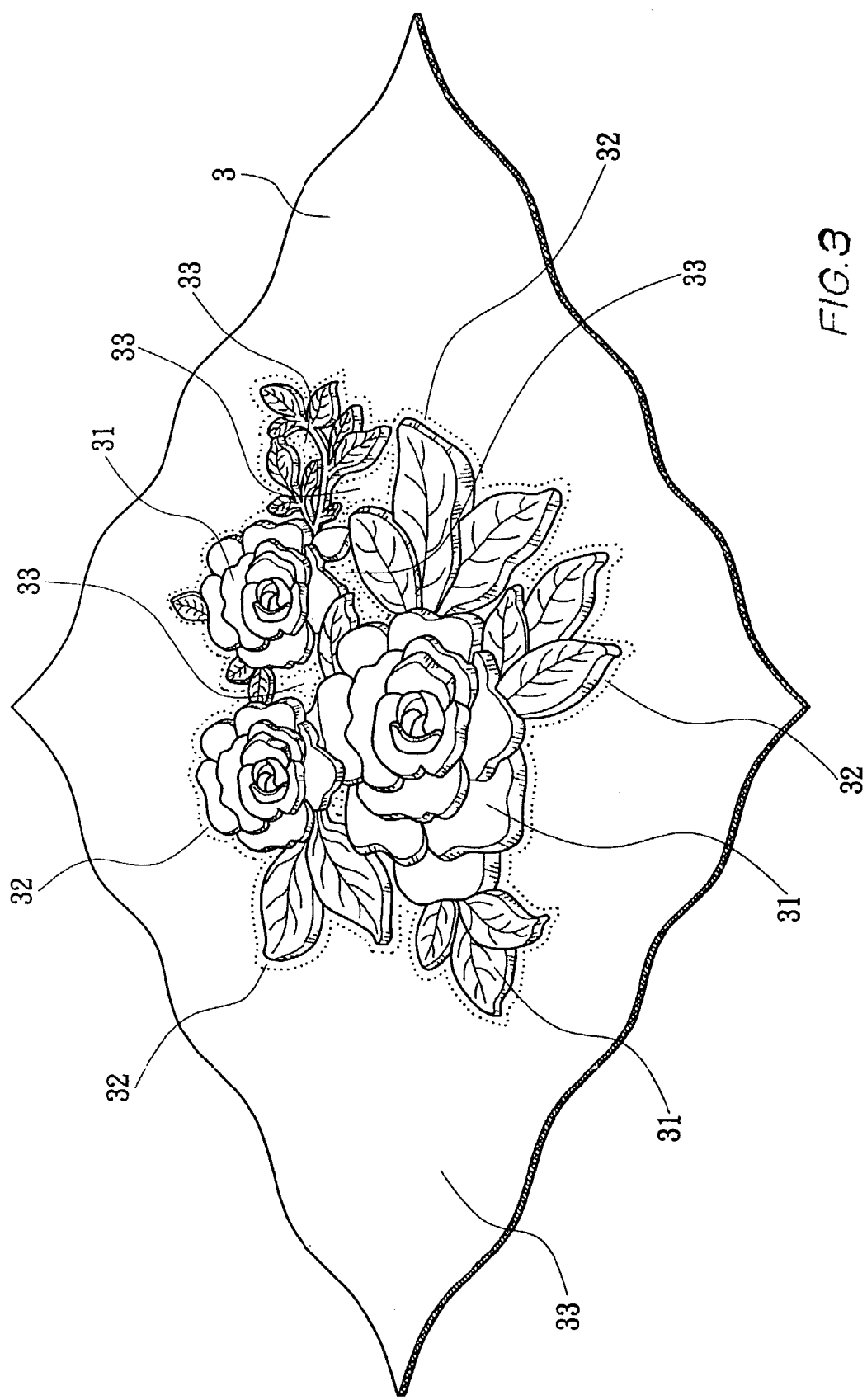
FIG. 3 is an example of embossed design formed on a garment by means of the heat pressing die set of the present invention.

Please refer to FIG. 3 that shows an example of embossed designs 31 heat-pressed on an area of a garment 3 with the die set of the present invention. There are areas 33 enclosed by two or more embossed designs 31 and having not any design provided thereon. That is, the non-design areas 33 are flat planes without any embossed design formed thereon. A plurality of continuous heat-pressed belts 32 are separately formed on the garment 3 along an overall outer periphery of all the embossed given designs 31 and perimeters of all the non-design areas 33 by the joined belt zones 12, 22 on the silicon die 11 and the metal die 21, respectively.

As can be clearly seen from FIG. 1, the metal die 21 on the female die seat 2 includes a plurality of recesses 23 provided at positions other than the flat belt zones 22 and the complementary male and female die surfaces corresponding to the given designs 31. The recesses 23 on the metal die 21 are not in contact with the silicon die 11, so that areas on the garment 3 corresponding to the recesses 23 are not heat-pressed when the male and female die seats 1, 2 of the die set are heated and closed to each other under pressure, as shown in FIG. 2. The non-design areas 33 on the garment 3 other than the heat-pressed belts 32 are therefore not heat-pressed to maintain an original hand touch of the material forming the garment 3.

When the silicon die 11 and the metal die 21 are tightly closed to bear against each other, the belt zones 12 and 22 are also in close contact with one another, and the areas on the garment 3 that are clamped between the belt zones 12 and 22 are flatly heat-pressed to form the heat-pressed belts 32 of a predetermined width along all peripheral edges of the given designs 31, as shown in FIG. 3.

The heat pressing die set of the present invention may be employed to heat press garments 3 made of different materials, including cotton, nylon, Tetoron (polyester films), and leather. The given designs 31 can be of any shape, such as flowers, living creatures, and various kinds of patterns.

The applicant has conducted experiments to emboss two garments made of the same material separately with a conventional heat pressing die and a heat pressing die set of the present invention showing the same design. A comparison between the embossed designs formed on the two garments clearly indicates the embossed design formed with the heat pressing die set of the present invention has ups and downs and contouring lines apparently sharper and more distinct than those on the garment heat-pressed with the conventional die.

The flat heat-pressed belts 32 of predetermined width surrounding all embossed designs 31 and non-design areas 33 feature the embossed designs formed on the garment 3 with the heat pressing die set of the present invention. As mentioned above, the flat heat-pressed belts 32 are formed by heat pressing areas of the garment 3 clamped between the belt zones 12, 22 on the silicon and the metal dies 11, 21, and have texture and hand touch significantly different from that of the embossed areas 31 and the non-heat-pressed areas 33 on the garment 3. The flat heat-pressed belts 32 also serve as frames of the embossed areas 31 to visually highlight them.

As it is known the material for the garment 3, either different types of fabrics or leather, tends to be extended or stretched by a certain degree when it is subjected to the heat-pressed molding process. The heat-pressed belts 32 locating between the embossed designs 31 and the non-heat-pressed areas 33 not only serve as frames of the embossed designs 31, but also serve to set and isolate the non-heat-pressed areas 33 from the embossed areas 31 to avoid undesired pulling by the embossed areas 31. In other words, the heat-pressed belts 32 enable the non-heat-pressed areas 33 to maintain the original material property and prevent the embossed designs 31 from deformation due to different tensional forces produced by the ups and downs formed thereon. With the heat pressing die set of the present invention, embossed designs formed on garments would have increased magnitude of embossment while having sharp lines contouring the designs. In other words, the embossed designs formed on garments with the die set of the present invention have upgraded quality to show more changes and present more layers of ups and downs to create unique embossing effect.

In practical use of the die set of the present invention to form embossed designs 31 on garments 3, the metal die 21 is first heated to a predetermined temperature depending on the material forming the garments 3. Generally, the metal die 21 is heated to about 150° C. for general cotton and nylon materials, and about 200° C. for the Tetoron (polyester films) material. Thereafter, selected areas on the garments 3 are clamped between the metal die 21 and the silicon die 11 under a predetermined tension, and the male and female die seats 1, 2 are closed to each other under pressure to heat press the areas of garments 3 positioned therebetween to form embossed designs 31 thereon.

What is claimed is:

1. A heat-pressing die set for forming embossed designs on garments comprising:
    a) a male die seat having a male die having:
        i) a plurality of male die surfaces; and
        ii) a plurality of male flat belt zones; and
    b) a female die seat having a female die having:
        i) a plurality of female die surfaces, the plurality of male and the plurality of female die surfaces are complementary die surfaces cut according to a predetermined design having at least one design area; and
        ii) a plurality of female flat belt zones, the plurality of male and the plurality of female flat belt zones are complementary flat surfaces, one set of the plurality of male and the plurality of female flat belt zones is located on an outer periphery of each of the at least one design area and an outer periphery of the predetermined design,
    wherein the male die seat and the female die seat are movable between disengaged and engaged positions, when the male die seat and the female die seat are in the disengaged position, the female die surfaces are separated from the male die surfaces, and, when the male die seat and the female die seat are in the engaged position, the female die surfaces align with and tightly fit against the male die surfaces forming a plurality of embossed designs on the garment and the female flat belt zones align with and tightly fit against the male flat belt zones forming a plurality of heat-pressed belts on the garment, one of the plurality of heat-pressed belts is located on an outer periphery of each individual design of the plurality of embossed designs and an outer periphery of the plurality of embossed designs,
    wherein the female die includes a plurality of recesses, each of the plurality of recesses is located adjacent to one of the plurality of female flat belt zones and is spaced apart from the male die maintaining a non-heat pressed area on the garment when the male die seat and the female die seat are located in the engaged position,
    wherein the die set is configured for embossing a tetoron garment or a leather garment,
    wherein the male die is a silicon die and the female die is a metal die or the male die is a metal die and the female die is a silicon die.

* * * * *